April 21, 1925. 1,534,918
L. W. CLAYBOURN
MOLD SUPPORT
Filed Oct. 9, 1922 3 Sheets-Sheet 1
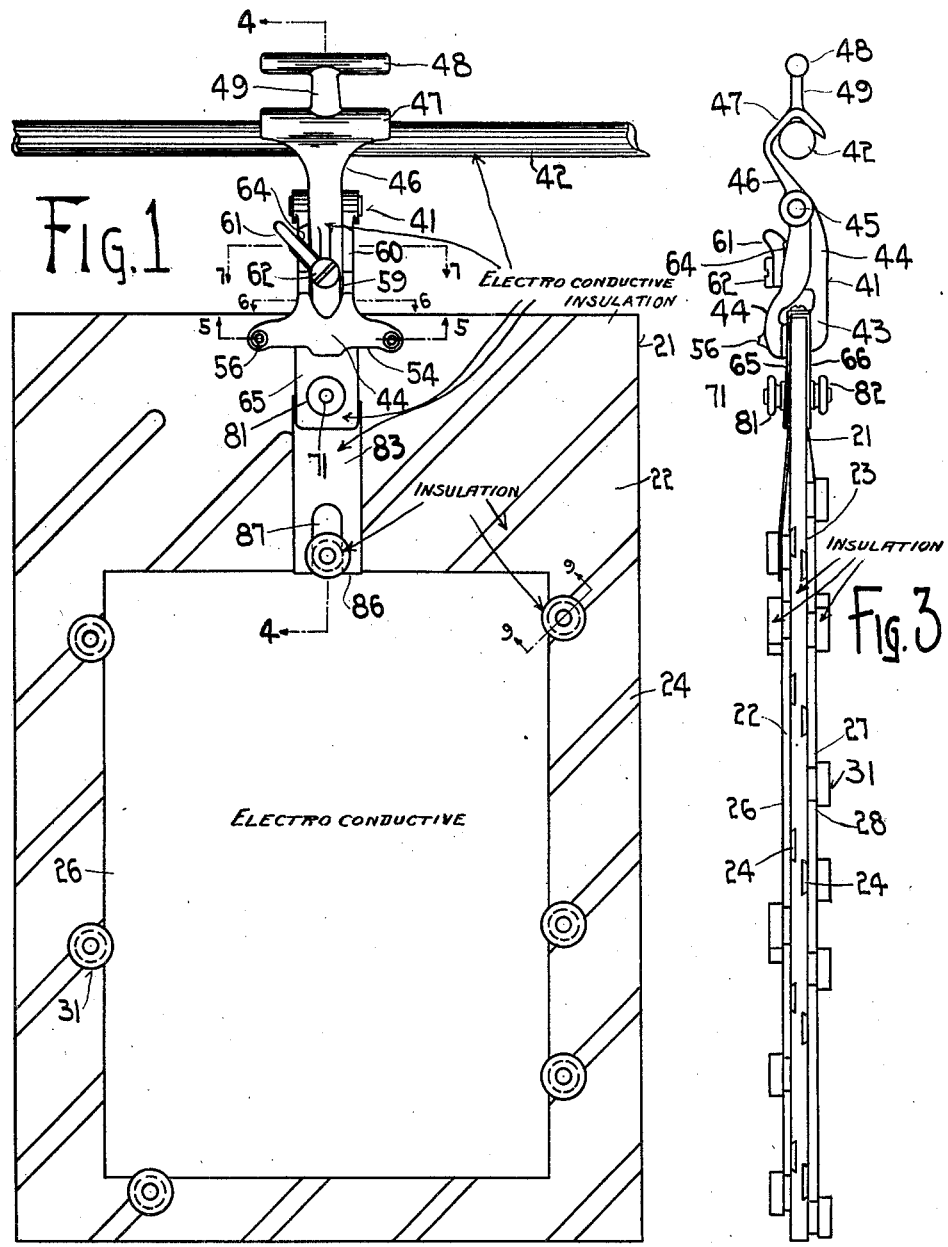

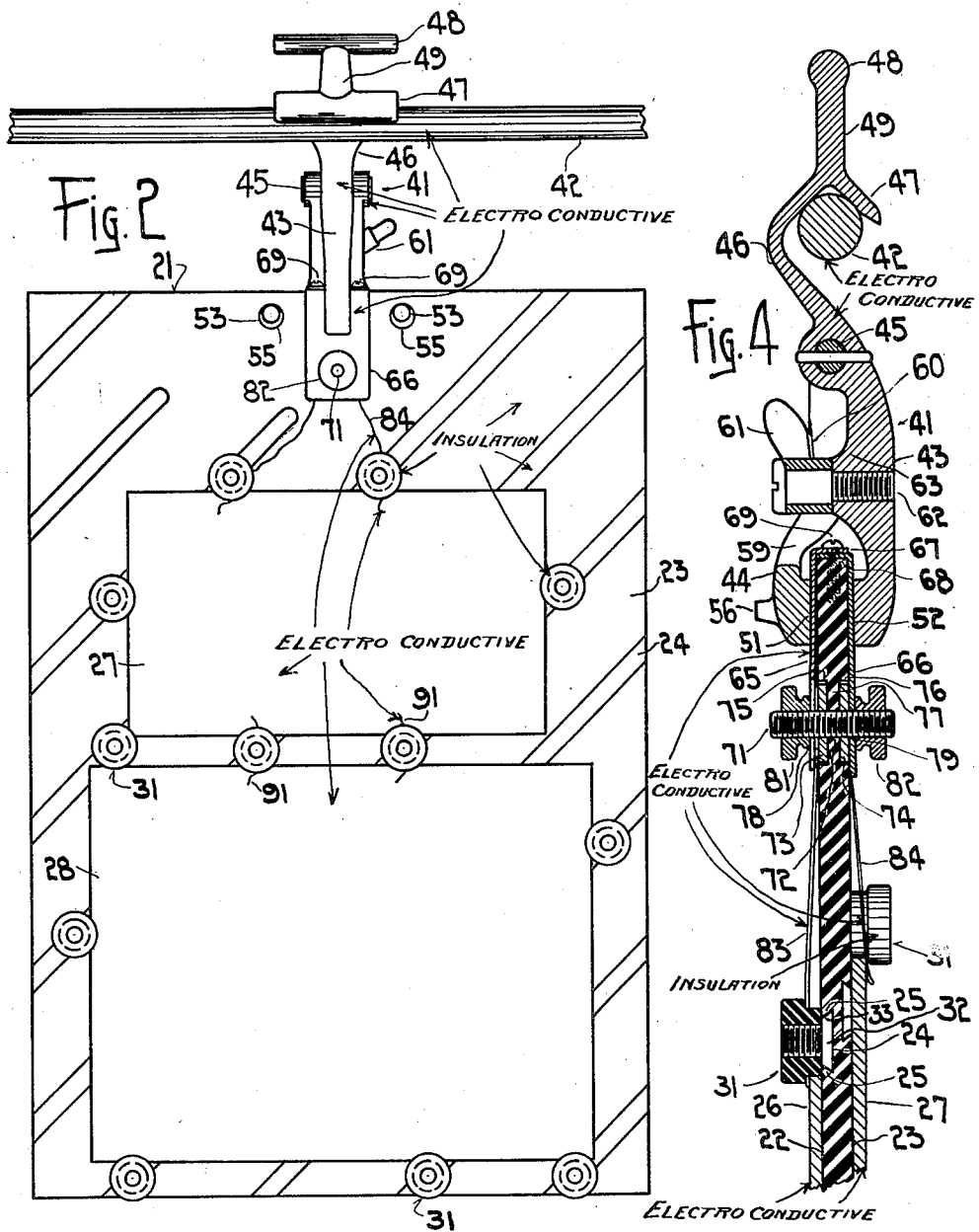

April 21, 1925.
L. W. CLAYBOURN
1,534,918
MOLD SUPPORT
Filed Oct. 9, 1922
3 Sheets-Sheet 3
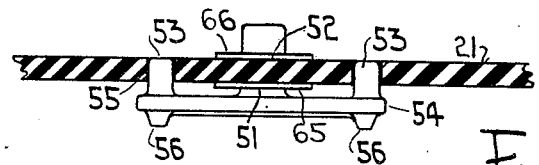
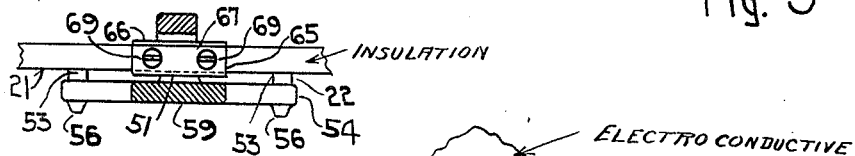
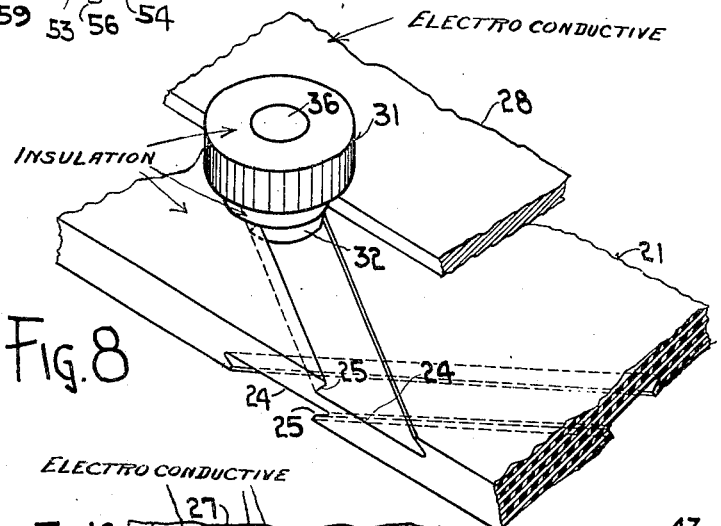
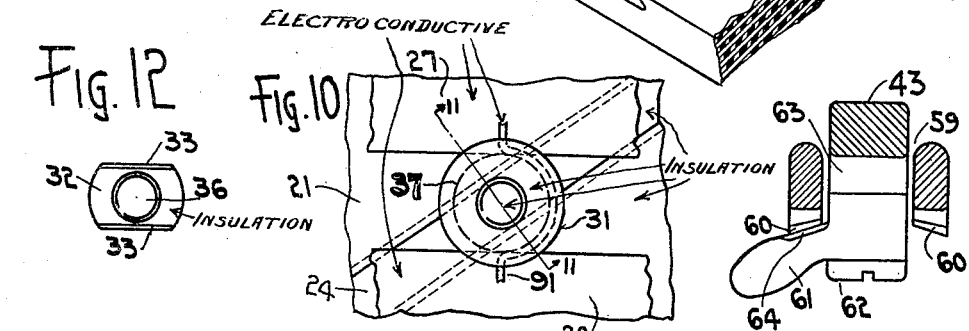
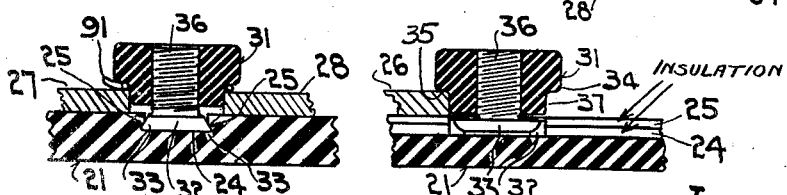
Inventor Patented Apr. 21, 1925.

1,534,918

UNITED STATES PATENT OFFICE.

LESLIE W. CLAYBOURN, OF MENASHA, WISCONSIN.

MOLD SUPPORT.

Application filed October 9, 1922. Serial No. 593,258.

*To all whom it may concern:*

Be it known that I, LESLIE W. CLAYBOURN, a citizen of the United States, residing at Menasha, in the county of Winnebago and State of Wisconsin, have invented certain new and useful Improvements in Mold Supports, of which the following is a specification.

My invention relates to mold supports primarily for use in making electrotypes in the printing art, and especially to mold supports employable for lead molds.

Lead molds as at present usually employed have impressions therein which are reverse to the printing surface of the electrotype which is to be made. These impressions are usually obtained by pressure in a hydraulic press capable of high pressures, between the pressure surfaces of which the lead plate for the mold and the plate having a surface similar to the printing surface thereon, are introduced, for receiving the pressure. Lead molds are instanced as molds to which, in the present state of the art, my invention is principally applicable.

It is the object of my invention to provide novel means for supporting the mold; further, to provide a plate having a surface to which the mold is secured, and means for suspending the plate so that the mold thereon receives its electrically deposited coating for forming the printing shell; further, to provide novel means for releasably securing a mold to a plate; further, to provide novel means whereby a mold or molds may be readily releasably secured to the plate; further, to provide novel means whereby molds may be readily secured to opposite faces of the plate; further, to provide novel means for supporting the insulating plate and providing electrical connection for the mold; further, to provide novel means for electric connection between the plate support or suspending device and the mold on the plate; and, further, to provide novel means for electrically interconnecting molds on the plate.

The invention will be further readily understood from the following description and claims, and from the drawings, in which latter:

Fig. 1 is a front elevation of my improved device, showing a single mold secured to the plate.

Fig. 2 is a rear elevation of my improved device, showing a plurality of molds secured to the plate.

Fig. 3 is an edge view of my improved device.

Fig. 4 is a vertical section taken on the line 4—4 of Fig. 1.

Fig. 5 is a horizontal cross-section taken on the line 5—5 of Fig. 1.

Fig. 6 is a horizontal cross-section taken on the line 6—6 of Fig. 1.

Fig. 7 is a horizontal cross-section taken on the line 7—7 of Fig. 1.

Fig. 8 is a perspective view showing the mold clamp in one of the diagonal grooves.

Fig. 9 is a cross-section taken on the line 9—9 of Fig. 1, showing one of the mold-clamps in its groove for directly clamping the mold.

Fig. 10 is an enlarged front elevation showing adjacent molds and electric connections therefor.

Fig. 11 is a cross-section of the same taken on the line 11—11 of Fig. 10; and,

Fig. 12 is a plan view of the slide-member of the mold-clamp.

A support 21 for the mold is exemplified as a plate, having opposite electrically non-conducting surfaces 22, 23, obtained preferably by forming the plate of an electrically non-conducting material, for instance, so-called bakelite, formica, hard rubber, or other material, which does not attract a deposit of the metal in electroplating the mold.

The plate is provided with recesses, exemplified as grooves 24, provided with overhanging walls 25, which are preferably formed in the material of which the plate is composed. These grooves are preferably located at the respective sides of the plate.

The molds are exemplified respectively at 26, 27, and 28, and may be of any forms or sizes desired within the capacity of the plate employed. A single mold may be employed on a side of the plate, or any number of molds may be employed to substantially cover the side, or as much of a side as desired may be left exposed.

The means I prefer to show for securing the mold to the plate consists of clamping devices 31, respectively comprising a base 32, having tongues 33 received under the overhanging walls of the grooves. The bases are arranged to slide in the grooves in order to position the clamps at suitable points along the grooves, to clamp the mold or molds to the plate, as by means of a clamping part 34, having a shoulder 35, received over the edge of the mold, and having threaded connection with the base. This threaded connection is obtained in the present exemplification by providing the base with a threaded shank 36, and forming the clamping part as a nut having threaded connection with said shank. The mold-clamps are preferably made of electrically non-conducting material similar to the mold-plate 21. The edges of the molds preferably rest against shanks 37 of the nut.

A suspending device 41 is provided for the plate, to suspend the plate from the usual cathode-bar 42 of the usual electro-plating tank. This suspending device is exemplified as comprising a pair of jaws 43, 44, pivoted together by a pivot-pin 45. One of the jaws has an upward extension 46, on which there is a suspending hook 47, for being received over the usual cathode-bar, a carrying handle 48 having connection with the suspending hook by means of a shank 49.

The jaws are provided with clamping faces 51, 52, arranged to clamp a plate between them. Suspending means are also preferably provided between the suspending clamp and the plate, exemplified as pins 53 projecting across the plane of the clamping faces from lateral extensions 54 on one of the jaws. These pins are arranged to be received through apertures 55 in the plate. The opposite faces of the lateral extensions are provided with lugs 56, on which to rest the suspending clamp on a suitable table for securing or releasing the molds with relation to the plate while clamped to the suspending clamp.

One of the jaws is provided with a slot 59, the walls of which form cam-faces 60. A cam-lever 61 is pivoted on a bolt 62 secured in a lug 63 extending into the slot from the other jaw. The cam-lever may be arranged parallel with the jaw to which it is pivoted, for separation of the jaws, and may be turned on its pivot for coaction between cam-faces 64 on the cam-lever and one of the cam-faces on the other jaw, for clamping the clamping faces toward one another.

Electro-conductive strips 65, 66, are provided at the respective sides of the supporting plate. The clamping faces of the jaws are electro-conductive, and have electric connection with the suspending hook 47, preferably by forming the suspending clamp of electro-conductive material. These clamping faces are clamped upon the elecero-conductive strips 65, 66. These electro-conductive strips are preferably secured to the plate, as by providing the strips with flanges 67, 68, projecting over the upper edge of the plate, screws 69 being received through holes in the flanges and threaded into the plate.

A screw-rod 71 is secured in the plate, as by being received through a hole 72 therein, nuts 73, 74, being threaded over the screw-rod and received in recesses 75, 76, in the plate, and clampingly held against the wall 77 between said recesses. The screw-rod is preferably received through holes 78, 79, in the respective electro-conductive strips 65, 66, these electro-conductive strips being preferably resilient to normally separate the same from the nuts 73, 74.

Nuts 81, 82, are threaded over the outer end of the screw-rod, and are arranged to clamp the electro-conductive strips toward the plate, and are exemplified as clamping an electro-conductive strip 83 at one side of the plate between the nut 73 and electro-conductive strip 65, and electro-conductive wires 84 at the other side of the plate between the inner nut 74 and the electro-conductive strip 66. The screw-rod and nuts are preferably made of electro-conductive material.

The other end of the electro-conductive strip 83 makes contact at 86 with the mold 26, and is provided with an end slot 87, through which one of the threaded shanks 36 is received, the shoulder 35 of the nut 34 clamping the electro-conductive strip 83 to the mold 26.

At the other side of the plate the wire 84 makes contact with the mold 27, and is clamped between the shoulder 35 of the nut 34 of one of the clamping devices and the mold for clamping the mold 27 to the plate and forming electric connection with the mold.

Electric connection between the molds 27 and 28 is obtained by means of electro-conductive wires 91, which make contact respectively with the mold 27 and the mold 28, and are clamped upon said molds by the shoulders 35 of the nuts 34 of the clamping devices between said molds, for clamping said molds to the plate and forming electric connection between them.

Said shoulders are arranged to make contact either direct with the edges of the molds, or suitable electric conductors may be interposed between said shoulders and the molds for forming electrical connections for said molds.

The clamping devices for clamping the mold to the plate are readily slidable in the grooves, and the grooves are shown open-ended at the edge of the plate, so that one or more of the clamping devices may be received in said respective grooves, or removed therefrom, depending on the number and form of molds and form of plate to be employed.

While I have exemplified lead molds as the molds to be secured to the plates, molds of other composition may of course be employed without departing from the spirit of my invention within the scope of the appended claims.

My improved device forms ready means for supporting molds in an electrolytic bath, for forming the electro-deposited shells of electrotypes, usually of copper or nickel, or other desired electro-deposited metal; forms novel means whereby said molds may be readily, securely and releasably fastened to a plate; whereby electric connections may be readily made with the molds; provides economy in time and rapid operation in placing the molds; provides economy in electro-deposited material, for the reason that the plate and the mold-clamps are of non-electric material, so as to be free from electro-deposits of the electrolytic bath, the deposits from the electrolytic bath being confined to the molds and the electric connections, although it is obvious that changes in these regards may be made without departing from the spirit of my invention within the scope of the appended claims.

Having thus fully described my invention, what I claim as new and desire to secure by Letters Patent, is:

1. A mold support of the character described, comprising a plate having a surface which is electrically non-conducting and provided with recesses, and mold clamping means having attachment with the walls of said recesses.

2. A mold support of the character described, comprising a plate having opposed surfaces which are electrically non-conducting and respectively provided with recesses, and mold clamping means for said respective sides having attachment with the walls of said recesses.

3. A mold support of the character described comprising a plate having a surface which is electrically non-conducting and provided with recesses, an electric conductor, and clamping means having attachment with the walls of said recesses for clamping a mold and said electric conductor to said plate.

4. A mold support of the character described comprising a plate provided with grooves having overhanging walls, and mold clamping means in said grooves.

5. A mold support of the character described comprising a plate whose opposite faces are provided with grooves.

6. A mold support of the character described comprising a plate whose opposite faces are provided with grooves relatively crossingly arranged.

7. A mold support of the character described comprising a plate having a surface which is electrically non-conducting and provided with grooves having overhanging walls, electric conductors, and clamping devices slidable in said grooves and provided with clamping means to clamp a plurality of molds and said electric conductors arranged between molds to said plate.

8. A mold support of the character described comprising a plate provided with grooves having overhanging walls, and clamping devices slidable in said grooves and provided with clamping parts operable at various positions along said grooves to clamp a mold to said plate.

9. A mold support of the character described comprising a plate provided with a groove having an overhanging wall, and a clamping device comprising a base slidable in said groove and a clamp for the mold having threaded connection with said base.

10. A mold support of the character described comprising a plate provided with diagonal grooves having overhanging walls, and mold clamping means slidable in said grooves.

11. A mold support of the character described comprising a plate whose opposite faces are provided with diagonal grooves having overhanging walls, and oppositely projecting mold clamping means in said grooves.

12. A mold support of the character described comprising a plate having opposite surfaces which are electrically non-conducting and respectively provided with grooves, the grooves of said opposite surfaces being relatively crossingly arranged, and mold clamping means in said grooves of said opposite surfaces.

13. A mold support of the character described comprising a supporting plate of electrically non-conducting material, means for releasably securing a mold thereon, and a supporting means for said plate, said supporting means comprising a part for connection with a cathode-bar.

14. A mold support of the character described comprising a supporting plate of electrically non-conducting material, securing means for releasably securing a mold thereon, a supporting means for said plate, said supporting means comprising a part for connection with a cathode-bar, and an electric connection between said supporting means and said securing means.

15. A mold support of the character described comprising a supporting plate having opposite surfaces of electrically non-conducting material, securing means at the opposite faces of said plate for securing molds at said opposite faces, a supporting means for said plate, said supporting means comprising a part for connection with a cathode-bar, and an electric connection at each side of said plate between said supporting means and said respective securing means.

16. A mold support of the character described comprising a supporting plate provided with grooves having overhanging walls, and slidable clamps for the mold slidable in said grooves, the surfaces of said supporting plate of the walls of said grooves and of said slidable clamps being electrically non-conductive, a supporting means comprising an electro-conductive part for connection with a cathode-bar, and an electric connection between said supporting plate and said mold.

17. A mold support of the character described comprising a supporting plate, releasable securing means thereon for a mold, a supporting clamp for said plate, and an electric connection between said clamp and said mold.

18. A mold support of the character described comprising a supporting plate for a mold, said supporting plate of electrically non-conductive material, a releasable clamp for attachment to a cathode-bar, and a handle on said clamp.

19. In a mold support of the character described, the combination of a plate for the mold, a releasable mold-clamp thereon, a releasable clamp for said plate, a hook-support for said clamp above said clamp for attachment to a cathode-bar, and a handle for the latter above said hook-support.

20. In a mold support of the character described, the combination of a plate for the mold, means for releasably securing a mold to said plate, and a releasable clamp for said plate, said plate and clamp provided with complemental supporting parts to support said plate independent of the clamping action of said clamp.

21. In a mold support of the character described, the combination of a plate for the mold, a releasable clamp for said plate, and an electro-conductive strip having electric connection with the mold on said plate, said strip clamped between said clamp and said plate.

22. In a mold support of the character described, the combination of a supporting plate for the mold, a clamp therefor comprising a pair of jaws, means between said jaws for drawing said jaws toward one another for clampingly holding said plate between them, and a hook-support for said jaws.

23. In a mold support of the character described, the combination of a supporting plate for the mold, a clamp therefor comprising a pair of jaws, means between said jaws for drawing said jaws toward one another for clampingly holding said plate between them, a hook-support for said jaws, and a handle for said hook-support.

24. In a mold support of the character described, the combination of a supporting plate for the mold, a pair of jaws, said jaws pivoted together, and means between said jaws for drawing said jaws toward one another for clampingly holding said plate between them, one of said jaws provided with an extension comprising a hook for a cathode-bar and a handle for manipulating the same.

25. In a mold support of the character described, the combination of a supporting plate for the mold, a clamp therefor, said plate and said clamp provided with complemental means for hanging said plate from said clamp, said clamp comprising jaws provided with clamping faces, and means for drawing said jaws toward one another for clampingly holding said plate between said clamping faces.

26. In a mold support of the character described, the combination of a supporting plate for the mold, a clamp therefor, said plate and said clamp provided with complemental means for hanging said plate from said clamp, said clamp comprising jaws provided with clamping faces, means for drawing said jaws toward one another for clampingly holding said plate between said clamping faces, and a hook on said clamp for being received over a cathode-bar.

27. In a mold support of the character described, the combination of a supporting plate for the mold, a clamp therefor, said plate provided with apertures and said clamp provided with pins received in said apertures for hangingly supporting said plate from said clamp, said clamp comprising a pair of jaws having articulation between them, and means between said jaws for drawing said jaws toward one another for clampingly holding said plate between them, said clamp provided with a hook for a cathode-bar.

28. In a mold support of the character described, the combination of a supporting plate for a mold, a clamp therefor, said plate provided with apertures and said clamp provided with pins received in said apertures for hangingly supporting said plate from said clamp, said clamp comprising a pair of jaws, a pivot between said jaws, a cam-lever between said jaws for clampingly moving said jaws toward one another, and a hook for a cathode-bar on said clamp.

29. In a mold support of the character described, the combination of a supporting plate for a mold, a clamp therefor, said plate provided with apertures and said clamp provided with pins received in said apertures for hangingly supporting said plate from said clamp, said clamp comprising a pair of jaws provided with clamping faces, pivoting means between said jaws, one of said jaws provided with an extension comprising a hook for a cathode-bar and a carrying handle.

30. In a mold support of the character described, the combination of a supporting plate for a mold, a clamp therefor, said plate provided with apertures and said clamp provided with pins received in said apertures for hangingly supporting said plate from said clamp, said clamp comprising a pair of jaws respectively provided with clamping faces, a pivot between said jaws, and a cam-lever for drawing said faces toward one another, one of said jaws provided with an extension comprising a supporting hook for a cathode-bar and a carrying handle.

31. In a mold support of the character described, the combination of a supporting plate for a mold, said supporting plate provided with apertures, a pair of jaws, a pivot between said jaws, one of said jaws provided with lower lateral extensions having pins thereon for being received in said apertures, said jaws provided with clamping faces between said lateral extensions, one of said jaws being provided with a longitudinal slot, and a cam-lever pivoted to the other of said arms on a pivot in said slot, and said cam-lever coacting with a wall of said slot to draw said clamping faces toward one another.

32. In a mold support of the character described, the combination of a supporting plate for a mold, said supporting plate provided with apertures, a pair of jaws, a pivot between said jaws, one of said jaws provided with lower lateral extensions having pins thereon at one side thereof for being received in said apertures, and with resting lugs on the other side thereof, said jaws provided with clamping faces between said lateral extensions, one of said jaws being provided with a longitudinal slot, and a cam-lever pivoted to the other of said arms on a pivot in said slot, and said cam-lever coacting with a wall of said slot to draw said clamping faces toward one another.

33. In a mold support of the character described, the combination of a supporting plate for a mold, a clamp for said plate comprising an arm provided with a clamping face at its lower end to form a jaw and a hook for a cathode-bar and a carrying handle at its upper end, a complemental jaw pivoted to said arm intermediate of the ends of said arm and provided with a clamping face complemental to said first-named clamping face, and means between said jaws to draw said clamping faces toward one another to clamp said plate.

34. In a mold support of the character described, the combination of a supporting plate for a mold, and a clamp for said plate comprising an arm provided with a clamping face at its lower end to form a jaw and a hook for a cathode-bar and a carrying handle at its upper end, a complemental jaw pivoted to said arm intermediate of the ends of said arm and provided with a clamping face complemental to said first-named clamping face, said jaws and said plate provided with a complemental pin and aperture to hangingly support said plate, and means between said jaws to draw said clamping faces toward one another to clamp said plate.

35. In a mold support of the character described, the combination of a supporting plate for a mold, and a clamp for said plate comprising an arm provided with a clamping face at its lower end to form a jaw and a hook for a cathode-bar and a carrying handle at its upper end, a complemental jaw pivoted to said arm intermediate of the ends of said arm and provided with a clamping face complemental to said first-named clamping face to clampingly act on said plate, one of said jaws provided with pins at the sides of said clamping faces, one of said arms provided with a slot, and a cam-lever on the other of said arms having a pivot in said slot and coacting with the wall of said slot.

36. In a mold support of the character described, the combination of a supporting plate for a mold having an electrically non-conducting surface, clamping means on said plate for clamping a mold to said plate, a supporting clamp comprising a pair of jaws, an electro-connective strip having electric connection with said mold, said plate and said strip located between said jaws, and means on said supporting clamp for clamping said jaws toward one another with said plate and strip between said jaws.

37. In a mold support of the character described, the combination of a supporting plate for a mold having electrically non-conducting surfaces at the respective sides thereof, clamping means on said plate for clamping molds to said respective sides, a supporting clamp comprising a pair of jaws, an electro-connective strip at each of said sides having electric connections with said respective molds, said plate and said strip located between said respective jaws, and means on said supporting clamp for clamping said jaws toward one another with said plate and said strips between said jaws.

38. In a mold support of the character described, the combination of a supporting plate for molds having electrically non-conducting surfaces at the respective sides thereof, clamping means on said plate for clamping molds to said respective sides, a supporting clamp comprising a pair of jaws, an electro-conductive strip at each side of said plate, a threaded rod received through said strips and said plate, and nuts at the respective ends of said threaded rod for clamping said strips toward said plate.

39. In a mold support of the character described, the combination of a supporting plate for molds having electrically non-conducting surfaces at the respective sides thereof, clamping means on said plate for clamping molds to said respective sides, a supporting clamp comprising a pair of jaws, an electro-conductive strip at the upper end of each side of said plate, each of said strips provided with a flange extending crosswise of the upper edge of said plate, means for securing said flanges to said upper edge, a threaded rod received through said strips and said plate, nuts under said strips for locking said threaded rod to said plate, and nuts at the respective ends of said threaded rod for clamping said respective strips toward said respective first-named nuts.

In testimony whereof, I have hereunto signed my name in the presence of two subscribing witnesses.

LESLIE W. CLAYBOURN.

Witnesses:
C. A. WESTBERG,
PETER C. JUNG.